(12) United States Patent
Brown et al.

(10) Patent No.: US 12,498,532 B2
(45) Date of Patent: Dec. 16, 2025

(54) ACTUATOR ASSEMBLY

(71) Applicant: CAMBRIDGE MECHATRONICS LIMITED, Cambridge (GB)

(72) Inventors: Andrew Benjamin Simpson Brown, Cambridge (GB); Stephen Bunting, Cambridge (GB); James Howarth, Cambridge (GB); Daniel Burbridge, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 693 days.

(21) Appl. No.: 17/291,334

(22) PCT Filed: Nov. 15, 2019

(86) PCT No.: PCT/GB2019/053260
§ 371 (c)(1),
(2) Date: May 5, 2021

(87) PCT Pub. No.: WO2020/099897
PCT Pub. Date: May 22, 2020

(65) Prior Publication Data
US 2022/0003957 A1 Jan. 6, 2022

(30) Foreign Application Priority Data
Nov. 15, 2018 (GB) .................................... 1818654

(51) Int. Cl.
*G02B 7/00* (2021.01)
*F16C 31/06* (2006.01)
(Continued)

(52) U.S. Cl.
CPC .............. *G02B 7/005* (2013.01); *G03B 5/04* (2013.01); *H02K 41/0356* (2013.01); *F16C 31/06* (2013.01); *G03B 2205/0069* (2013.01)

(58) Field of Classification Search
CPC ........ G03B 2205/00; G03B 2205/0069; G03B 2205/0053; G03B 2205/0084; G03B 5/04;
(Continued)

(56) References Cited

U.S. PATENT DOCUMENTS 4,505,464 A * 3/1985 Chitayat ................ H02K 41/02
269/21
6,317,391 B1 11/2001 Schell et al.
(Continued)

FOREIGN PATENT DOCUMENTS

CN 102162898 A 8/2011
CN 206788527 U 12/2017
(Continued)

OTHER PUBLICATIONS

DE_102017127404_A1_Translation (Year: 2023).*
(Continued)

*Primary Examiner* — Christopher M Koehler
*Assistant Examiner* — Ahmed F Seck
(74) *Attorney, Agent, or Firm* — Van Hoven PC; Stefan D. Osterbur; Joshua Van Hoven

(57) ABSTRACT

An actuator assembly comprises a static part and a movable part. A helical bearing arrangement supporting the movable part on the static part guides helical movement of the movable part with respect to the static part around a helical axis. One or more actuators, that are not shape memory alloy actuators, are arranged to drive movement of the movable part around the helical axis, which thereby includes a component of translational movement along the helical axis. The helical movement increases the force within the actuator assembly allowing actuation of heavier movable parts, and may improve posture.

19 Claims, 11 Drawing Sheets

(51) Int. Cl.
  *G03B 5/04* (2021.01)
  *H02K 41/035* (2006.01)
(58) Field of Classification Search
  CPC .... G03B 30/00; F16C 31/06; F16C 2370/206; G02B 7/0056; F04D 29/04; H02K 41/0356; H04N 23/54; H04N 23/55; H04N 23/57
  USPC .......................... 359/817, 823; 310/12.14, 31
  See application file for complete search history.

(56) References Cited

U.S. PATENT DOCUMENTS

| | | | |
|---|---|---|---|
| 2005/0258714 A1 | 11/2005 | Henderson et al. | |
| 2009/0073578 A1* | 3/2009 | Ide | G02B 5/005 |
| | | | 359/885 |
| 2009/0195898 A1 | 8/2009 | Naitou | |
| 2009/0244731 A1 | 10/2009 | Yu | |
| 2010/0060778 A1 | 3/2010 | Tsuchiya et al. | |
| 2012/0188435 A1* | 7/2012 | Fan | G02B 13/009 |
| | | | 348/340 |
| 2013/0136438 A1 | 5/2013 | Lee et al. | |
| 2014/0009631 A1* | 1/2014 | Topliss | H04N 23/687 |
| | | | 348/208.11 |
| 2014/0123789 A1* | 5/2014 | Saunders | F16H 25/12 |
| | | | 74/89.23 |
| 2014/0307331 A1 | 10/2014 | Kudoh | |
| 2016/0097937 A1 | 4/2016 | Lam | |
| 2016/0280870 A1* | 9/2016 | Nagai | H04N 23/57 |
| 2017/0118411 A1* | 4/2017 | Morinaga | G02B 27/646 |
| 2019/0158749 A1* | 5/2019 | Kunick | H04N 23/67 |
| 2021/0263392 A1 | 8/2021 | Brown et al. | |

FOREIGN PATENT DOCUMENTS

| | | | |
|---|---|---|---|
| DE | 69630522 T2 | 8/2004 | |
| DE | 102017127404 A1 * | 5/2019 | .......... F16D 65/183 |
| JP | 2003262802 A | 9/2003 | |
| KR | 20100056203 A | 5/2010 | |

OTHER PUBLICATIONS

GB Search Report dated May 8, 2019 of GB Application 1818654.4.
International Search Report and Written Opinion of PCT/GB2019/053260 dated Jul. 2, 2020.
Office Action for Republic of Korea application No. 10-2021-7016614, dated Oct. 31, 2024.

* cited by examiner

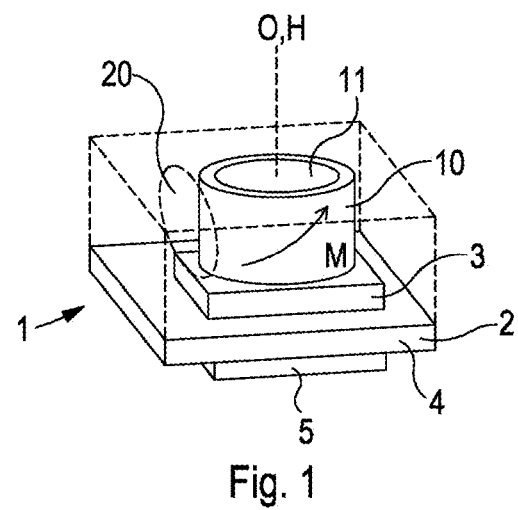
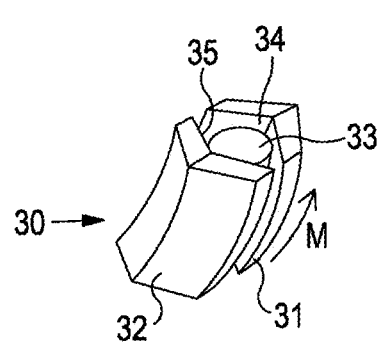 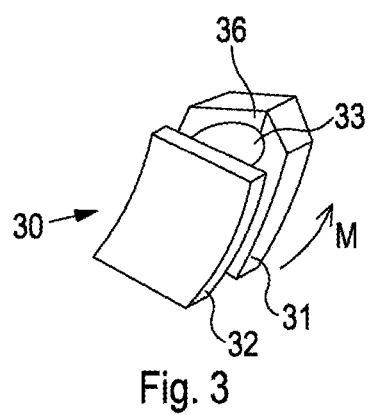
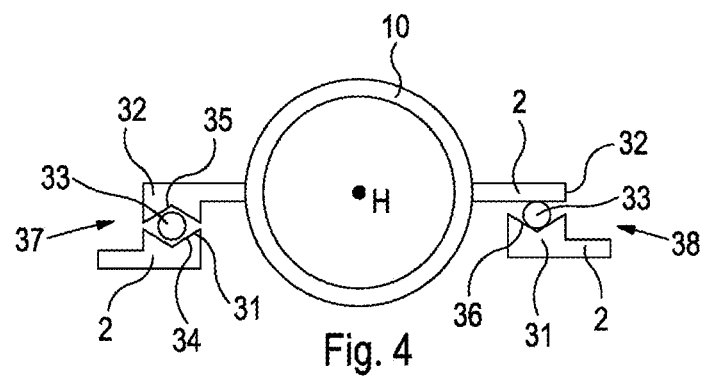

ACTUATOR ASSEMBLY

CROSS-REFERENCE TO RELATED APPLICATIONS

This application is a national stage application under 35 U.S.C. § 371 of International Application PCT/GB2019/053260, filed Nov. 15, 2019, which claims priority of GB Patent Application 1818654.4, filed Nov. 15, 2018. The disclosure of which are hereby incorporated by reference herein in their entireties.

The present application relates to an actuator assembly wherein one or more actuators, that are not shape memory alloy actuators, are used to provide translational movement of a movable part with respect to a static part.

Various types of actuators other than shape memory alloy actuators are known for driving translational movement of a movable part with respect to a static part, for example a voice coil motor (VCM), or a piezoelectric actuator. Such actuators may be applied in a variety of devices including handheld devices, such as cameras and mobile phones. Such actuators may be applied, for example, in an optical device such as a camera for driving translational movement of a camera lens element along its optical axis, for example for focusing or zoom.

Miniaturisation is an important design criteria in many types of actuator assembly employing such an actuator, but has various limiting consequences.

A first consequence is that the size of any helical bearing arrangement used to guide movement of the movable part with respect to the static part is limited, giving rise to tilting of the movable part, i.e. poor posture. For example, if a helical bearing arrangement were to be formed by a ball bearing or plane bearing extending along the movement direction, then the length of the bearing would be limited by the size and stroke of the actuator assembly, which tends to give rise to tilting of the movable part due to finite tolerances on the bearing surfaces. Similarly, if a helical bearing arrangement were to be formed by flexures, then the spacing between the flexures would be relatively small, which tends to give rise to tilting of the movable part due to finite tolerances on the flexures and their lateral stiffness.

A second consequence is that the force used to drive the movement of the movable part are relatively low, meaning that the resulting forces generated by the actuators are correspondingly low. This in turn means that the weight of gravity on the movable part results in variation in the positional control, depending on the orientation of the actuator assembly.

It would be desirable to reduce either or both of these problems in an actuator assembly.

According to the present disclosure, there is provided an actuator assembly comprising: a static part; a movable part; a helical bearing arrangement supporting the movable part on the static part and arranged to guide helical movement of the movable part with respect to the static part around a helical axis; and one or more actuators, that are not shape memory alloy actuators, arranged to drive movement of the movable part with respect to the static part around the helical axis.

The driven movement of the movable part with respect to the static part around the helical axis thereby includes a component of translational movement along the helical axis, which is the desired translational movement. By arranging the helical bearing arrangement to guide helical movement of the movable part with respect to the static part, the problems of poor posture and low force discussed above are reduced compared to a helical bearing arrangement that drives movement along a direction of desired translational movement, because the helical bearing arrangement gears down the ratio of the travel of the one or more actuators to the stroke of the movable part.

With regards to posture, as the helical bearing arrangement guides helical movement tilting is reduced. For example, if the helical bearing arrangement were to be formed by a helical bearing, such as a ball bearing or a plane bearing, then the length of the bearings is increased within the limited size and stroke of the actuator assembly, thereby reducing tilting of the movable part permitted within the finite tolerances on the bearing surfaces. Similarly, if the helical bearing arrangement were to be formed by flexures, then the spacing between the flexures would be increased, thereby reducing tilting of the movable part permitted within the finite tolerances on the flexures and their lateral stiffness.

With regards to forces, the force used to drive the movement of the movable part are increased due to the gearing, meaning that the resulting forces generated by the actuators are correspondingly increased. This reduces variation in the positional control caused by gravity acting on the movable part in dependence on the orientation of the actuator assembly. Effectively, this allows the movable parts to have a greater mass.

The actuator may be of any type other than a shape memory alloy actuator. Advantageously, the or each actuator may be a voice coil motor, but other types of actuator are possible, for example a piezoelectric actuator, a radial motors or others.

In the case of a voice coil motor, this may comprise a coil mounted on the static part and a magnetic element mounted on the movable part.

The one or more actuators may be any number of actuators, for example a single actuator, two actuators, or more actuators.

The actuator assembly may comprise a single actuator comprising a coil mounted on the movable element and extending around the helical axis, and plural magnetic elements mounted on the static part and spaced around the helical axis. Advantageously, such an arrangement assists in balancing the forces applied to the movable element, and thereby reduces tilting.

The or each actuator may be arranged to apply a force along the helical axis, which is along the direction of the desired translational movement. Advantageously, this may cause the one or more actuators to load the helical bearing arrangement.

In an alternative, the or each actuator may be arranged to apply a force orthogonal to the helical axis. In that case, the one or more actuators drive rotational movement of the movable part around the helical axis which the helical bearing arrangement converts into helical movement. This may cause the one or more actuators to load the suspension system.

In another alternative, the or each actuator may be arranged to apply a force helically around the helical axis.

Various different types of helical bearing arrangement may be used to guide the helical movement of the movable part with respect to the static part.

In one example, the helical bearing arrangement may comprise one or more helical bearings. In that case, a resilient element may be arranged to load the one or more helical bearings and/or the one or more actuators may be arranged to load the one or more helical bearings.

In another example, the helical bearing arrangement may comprise at least one flexure extending between the static part and the movable part.

Particular advantage is achieved when the actuator assembly is of a type in which the movable part is a lens element comprising at least one lens, for example where the helical axis is the optical axis of the lens element. There are many applications where it is desirable to minimise the size along the direction of translational movement of such a lens element. For example, the actuator assembly may be a camera wherein the static part has an image sensor mounted thereon and the lens element is arranged to focus an image on the image sensor. The advantages of size reduction achieved by the present disclosure are particularly valuable in a handheld device where space is at a premium and in a miniature device, for example wherein the at least one lens has a diameter of at most 20 mm, preferably at most 15 mm, preferably at most 10 mm.

However, the present disclosure may in general be applied to any type of device that comprises a static part and a moveable part which is moveable with respect to the static part. By way of non-limitative example, the actuator assembly may be, or may be provided in, any one of the following devices: a smartphone, a camera, a foldable smartphone, a foldable smartphone camera, a foldable consumer electronics device, an image capture device, a 3D sensing device or system, a servomotor, a consumer electronic device, a mobile computing device, a mobile electronic device, a laptop, a tablet computing device, an e-reader (also known as an e-book reader or e-book device), a computing accessory or computing peripheral device (e.g. mouse, keyboard, headphones, earphones, earbuds, etc.), a security system, a gaming system, a gaming accessory (e.g. controller, headset, a wearable controller, etc.), an augmented reality system, an augmented reality device, a virtual reality system, a virtual reality device, a wearable device (e.g. a watch, a smartwatch, a fitness tracker, etc.), a drone (aerial, water, underwater, etc.), an aircraft, a spacecraft, a submersible vessel, a vehicle, and an autonomous vehicle. It will be understood that this is a non-exhaustive list of example devices.

Actuator assemblies as described herein may be used in devices/systems suitable for image capture, 3D sensing, depth mapping, aerial surveying, terrestrial surveying, surveying in or from space, hydrographic surveying, underwater surveying, scene detection, collision warning, security, facial recognition, augmented and/or virtual reality, advanced driver-assistance systems in vehicles, autonomous vehicles, gaming, gesture control/recognition, robotic devices, robotic device control, touchless technology, home automation, medical devices, and haptics.

Certain embodiments of the present disclosure will now be described, by way of example only, with reference to the accompanying drawings, in which:

FIG. 1 is a schematic view of an actuator assembly that is a camera;

FIGS. 2 and 3 are perspective views of two helical bearings;

FIG. 4 is a schematic cross-sectional view of the actuator assembly with different helical bearing arrangements;

Figure 5:
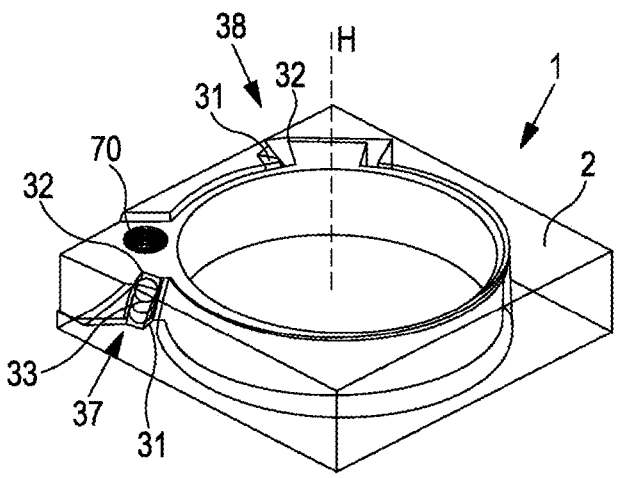
FIGS. 5 and 6 are perspective views of an example of the actuator assembly as shown in FIG. 4.

Except where the context requires otherwise, the term "bearing" is used herein as follows. The term "bearing" is used herein to encompass the terms "sliding bearing", "plain bearing", "rolling bearing", "ball bearing", "roller bearing", an "air bearing" (where pressurised air floats the load) and "flexure". The term "bearing" is used herein to generally mean any element or combination of elements that functions to constrain motion to only the desired motion and reduce friction between moving parts. The term "sliding bearing" is used to mean a bearing in which a bearing element slides on a bearing surface, and includes a "plain bearing". The term "rolling bearing" is used to mean a bearing in which a rolling bearing element, for example a ball or roller, rolls on a bearing surface. Such a rolling bearing element may be a compliant element, for example a sac filled with gas. In embodiments, the bearing may be provided on, or may comprise, non-linear bearing surfaces.

In some embodiments of the present disclosure, more than one type of bearing element may be used in combination to provide the bearing functionality. Accordingly, the term "bearing" used herein includes any combination of, for example, plain bearings, ball bearings, roller bearings and flexures.

An actuator assembly 1 that is a camera is shown schematically in FIG. 1.

The actuator assembly 1 comprises a static part 2 that has an image sensor 3 mounted thereon. The static part 2 may take any suitable form, typically including a base 4 to which the image sensor is fixed. The static part 2 may also support an IC chip 5 described further below.

The actuator assembly 1 also comprises a lens element 10 that is the movable part in this example. The lens element 10 comprises a lens 11, although it may alternatively comprise plural lenses. The lens element 10 has an optical axis O aligned with the image sensor 3 and is arranged to focus an image on the image sensor 3.

The actuator assembly 1 is a miniature device. In some examples of a miniature device, the lens 11 (or plural lenses, when provided) may have a diameter of at most 20 mm, preferably at most 15 mm, preferably at most 10 mm.

Although the actuator assembly 1 in this example is a camera, that is not in general essential. In some examples, the actuator assembly 1 may be an optical device in which the movable part is a lens element but there is no image sensor. In other examples, the actuator assembly 1 may be a type of apparatus that is not an optical device, and in which the movable part is not a lens element and there is no image sensor. Examples include apparatuses for depth mapping, face recognition, game consoles, projectors and security scanners.

The actuator assembly 1 also comprises a helical bearing arrangement 20 (shown schematically in FIG. 1) that supports the lens element 10 on the static part 2. The helical bearing arrangement 20 is arranged to guide helical movement of the lens element 10 with respect to the static part 2 around a helical axis H. The helical axis H in this example is coincident with the optical axis O and the helical movement is shown in FIG. 1 by the arrow M. Preferably, the helical motion is along a right helix, that is, a helix with constant radius, but in general any helix is possible. The pitch of the helix may be constant or vary along the helical motion. Preferably, the helical movement is generally only a small portion (less than one quarter) of a full turn of the helix.

The helical motion of the lens element 10 guided by the helical bearing arrangement 20 includes a component of translational movement along the helical axis H and rotational movement around the helical axis H. The translational movement along the helical axis H is the desired movement of the lens element 10, for example to change the focus of the image on the image sensor 3 and/or to change the magnification (zoom) of the image on the image sensor 3. The rotational movement around the helical axis H is in this example not needed for optical purposes, but is in general acceptable as rotation of the lens element 10 does not change the focus of the image on the image sensor 3.

The helical bearing arrangement 20 may take a variety of forms.

One possibility is that the helical bearing arrangement 20 comprises one or more helical bearings 30 that are rolling bearings, examples of which are shown in FIGS. 2 and 3. In each of FIGS. 2 and 3, the helical bearing 30 comprises a pair of bearing surfaces 31 and 32 and plural rolling bearing elements 33, for example balls, disposed between the bearing surfaces 31 and 32. One of the bearing surfaces 31 and 32 is provided on the static part 2 and the other of the bearing surfaces 31 and 32 is provided on the lens element 10.

The helical bearing 30 guides the helical movement of the lens element 10 with respect to the static part 2 as shown by the arrow M. This may be achieved by the bearing surfaces 31 and 32 extending helically around the helical axis H that is following a line that is helical. That said, in practical embodiments, the length of the bearing surfaces 31 and 32 may be short compared to the distance of the bearing surfaces 31 and 32 from the helical axis H, such that their shape is close to straight or even each being straight, provided that the one or more helical bearings of the helical bearing arrangement 20 guide helical movement of the lens element 10 with respect to the support structure 2. Plural helical bearings 30 are typically present, located at different angular positions around the helical axis H, in which case the helical bearings 30 have different orientations so that they cooperate and maintain adequate constraints to guide the helical movement of the lens element 10 with respect to the static part 2, even if the bearing surfaces 31 and 32 of an individual helical bearing 30 are straight.

In the example of FIG. 2, the bearing surfaces 31 and 32 each comprise respective grooves 34 and 35 in which the rolling bearing elements 33 are seated. In this example, the grooves 34 and 35 constrain transverse translational movement of the lens element 10 with respect to the static part 2, that is transverse to the direction of movement shown by arrow M. The grooves shown in FIG. 2 are V-shaped in cross-section, but other cross-sections are possible, for example curved as in portions of a circle or an oval. In general, the grooves 34 and 35 provide two points of contact with the respective rolling bearing elements 33. The grooves 34 and 35 may extend helically. Alternatively, in practical embodiments, the length of the bearing surfaces 31 and 32 may be short compared to the distance of the bearing surfaces 31 and 32 from the helical axis H, in which case the grooves 34 and 35 may be straight or close to straight, provided that the one or more helical bearings 30 of the helical bearing arrangement 20 guide helical movement of the lens element 10 with respect to the support structure 2

In the example of FIG. 3, a first bearing surface 31 comprises a groove 36 in which the rolling bearing elements 33 are seated and a second bearing surface 32 wherein the bearing surface is 'planar'. The first bearing surface 31 comprising a groove 36 may be provided on either one of the static part 2 and the lens element 10, with the second bearing surface 32 being provided on the other one of the static part 2 and the lens element 10. In the example of FIG. 3, the helical bearing 30 does not constrain transverse translational movement of the lens element 10 with respect to the static part 2, that is transverse to the direction of movement shown by arrow M. The bearing surface 32 is 'planar' in the sense that it is a surface which is not a groove and one which provides only a single point of contact with the ball. In other words, the bearing surface 32 is effectively planar across a scale of the width of the rolling bearing element 33, although be helical at a larger scale. For example, as pictured, the 'planar' surface is helical, being a line in cross section which twists helically along the movement direction, maintaining a single point of contact with the ball at any time. Alternatively and as mentioned above, in practical embodiments the length of the bearing surfaces 31 and 32 may be short, in which case the bearing surface 32 may be planar or close to planar, provided that the one or more helical bearings 30 of the helical bearing arrangement 20 guide helical movement of the lens element 10 with respect to the support structure 2.

A single rolling bearing element 33 is shown in FIGS. 2 and 3 by way of example, but in general may include any plural number of rolling bearing elements 33.

In some examples, the helical bearing 30 may include a single rolling bearing element 33. In that case, the helical bearing 30 by itself does not constrain the rotational movement of the lens element 10 with respect to the static part 2 about the single rolling bearing element 33, that is around an axis transverse to the direction of movement shown by arrow M. However, this minimises the overall size of the helical bearing 30, and in particular the height of the helical bearing 30 projected along the helical axis H as it is only needed to accommodate the size of the rolling bearing element 33 and the relative travel of the bearing surfaces 31 and 32.

In other examples, the helical bearing 30 may include plural rolling bearing element 33. In that case, the helical bearing 30 constrains the rotational movement of the lens element 10 with respect to the static part 2 about either one of the rolling bearing elements 33, that is around an axis transverse to the direction of movement shown by arrow M. However, compared to use of a single rolling bearing element 33, this increases the overall size of the helical bearing 30, and in particular the height of the helical bearing 30 projected along the helical axis H.

The helical bearing arrangement may in general comprise any number of helical bearings 30 with a configuration chosen to guide the helical movement of the lens element 10 with respect to the static part 2 while constraining the movement of the lens element 10 with respect to the static part 2 in other degrees of freedom. Many helical bearing arrangements may comprise plural helical bearings 30 and at least one which comprises plural rolling bearing elements 30.

Some specific examples of the actuator assembly 1 with different possible helical bearing arrangements are illustrated in FIGS. 4, 8, 9 and 10 which are schematic plan views normal to the helical axis showing the static part 2, the lens element 10 and the helical bearings 30.

FIG. 4 illustrates a possible helical bearing arrangement that includes two helical bearings 37 and 38 only. The helical bearings 37 and 38 are arranged on opposite sides of the lens element 10.

The first helical bearing 37 is of the same type as the helical bearing 30 shown in FIG. 2 wherein the bearing surfaces 31 and 32 each comprise respective grooves 34 and 35. The first helical bearing 37 includes plural rolling bearing elements 33 to constrain the relative movement of the lens element 10 and the static part 2.

The second helical bearing 38 is of the same type as the helical bearing 30 shown in FIG. 3 wherein the first bearing surface 31 comprises a groove 36 in which the rolling bearing elements 33 are seated and the second bearing surface 32 is planar. FIG. 4 illustrates the case that the first bearing surface 31 of the second helical bearing 38 is on the static part 2, but it could alternatively be on the lens element 10. The second helical bearing 38 may comprise a single rolling bearing element 33 or plural rolling elements 33 and principally adds a constraint against relative rotation of the lens element 10 and the static part 2 around the direction of movement (arrow M) of the first helical bearing 37.

The helical bearing arrangement of FIG. 4 includes a smaller number of helical bearings (i.e. two) than the other examples below, which simplifies the construction and reduces footprint of the actuator assembly 1.

Figure 6:
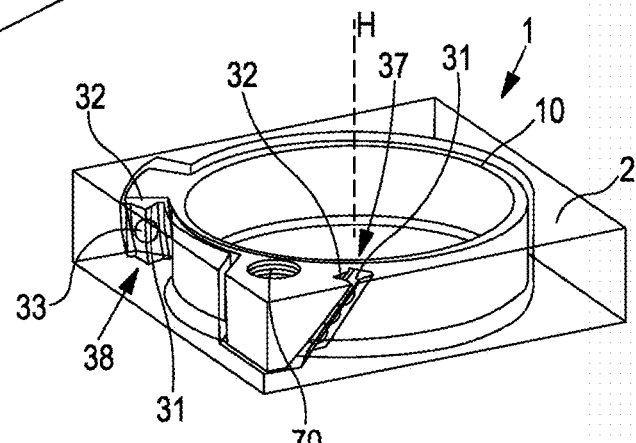
Figure 7:
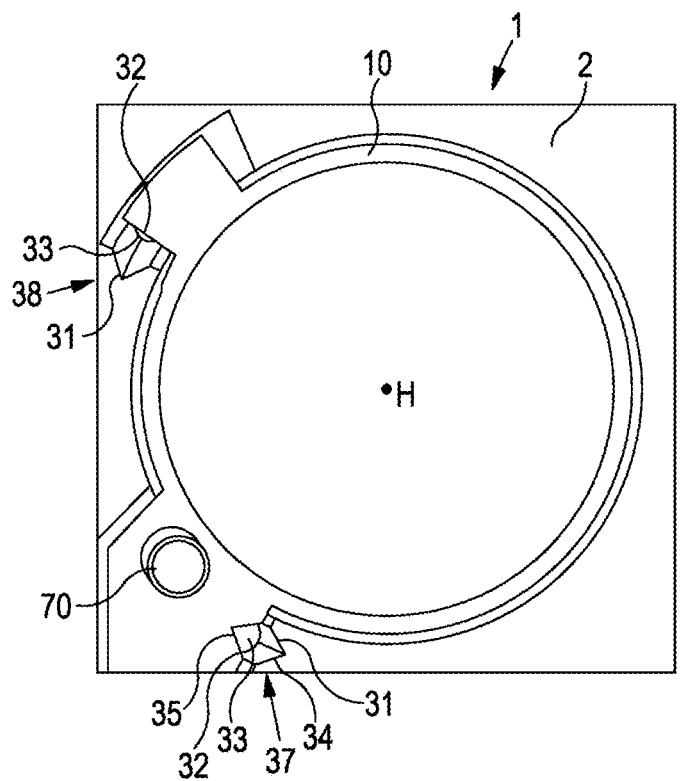
FIG. 7 is a plan view of the actuator assembly shown in FIGS. 5 and 6.

FIGS. 5 to 7 illustrate an example of the actuator assembly 1 shown in FIG. 4, wherein the static part 2 and the lens element 10 are formed by moulded components. In FIGS. 5 to 7, the detailed form of the static part 2, the lens element 10 and the helical bearings 37 and 38 can be seen. In addition, the actuator assembly 1 includes a resilient element 70 connected in compression between the support structure 2 and the lens element 10 and extending parallel to the helical axis H, so providing a force along the helical axis H. As a result, the resilient element 70 loads the one or more helical bearings. The resilient element 70 is in this example a spring, but in principle could be formed by any other element for example being a flexure or a piece of resilient material.

Figure 8:
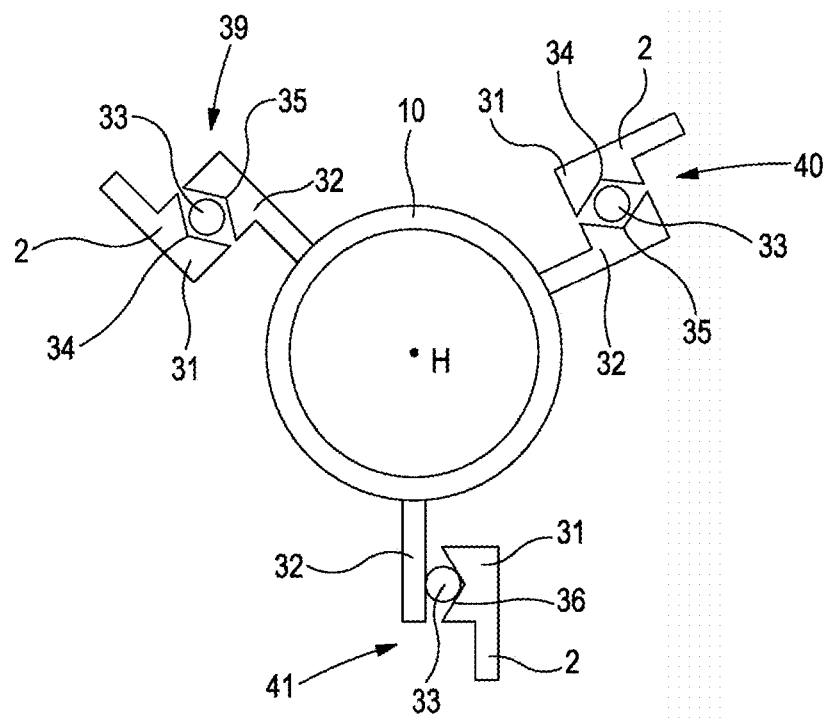
FIGS. 8 to 10 are schematic cross-sectional views of the actuator assembly with different helical bearing arrangements.

FIG. 8 illustrates a possible helical bearing arrangement that includes three helical bearings 39, 40 and 41 only. The three helical bearings 39, 40 and 41 are equally angularly spaced around the helical axis H, but they could alternatively be spaced unequally.

The first and second helical bearings 39 and 40 are of the same type as the helical bearing 30 shown in FIG. 2 wherein the bearing surfaces 31 and 32 each comprise respective grooves 34 and 35.

The third helical bearing 41 is of the same type as the helical bearing 30 shown in FIG. 3 wherein the first bearing surface 31 comprises a groove 36 in which the rolling bearing element 33 is seated and the second bearing surface 32 is planar. FIG. 8 illustrates the case that the first bearing surface 31 of the third helical bearing 41 is on the lens element 10, but it could alternatively be on the static part 2.

Each of the three helical bearings 39, 40 and 41 may comprise a single rolling or plural bearing elements 33. This is possible because the constraints imposed by three helical bearings 39, 40 and 41, and in particular the grooves of the first and second helical bearings 39 and 40 sufficient to constrain the movement of the lens element 10 with respect to the static part 2 in degrees of freedom other than the helical movement. As a result of using only a single rolling bearing element 33 in each of the three helical bearings 39, 40, 41, the overall size of the three helical bearings 39, 40 and 41, and in particular the height of the three helical bearings 39, 40 and 41 projected along the helical axis H is reduced compared to the helical bearing arrangement of FIG. 4.

Figure 10:
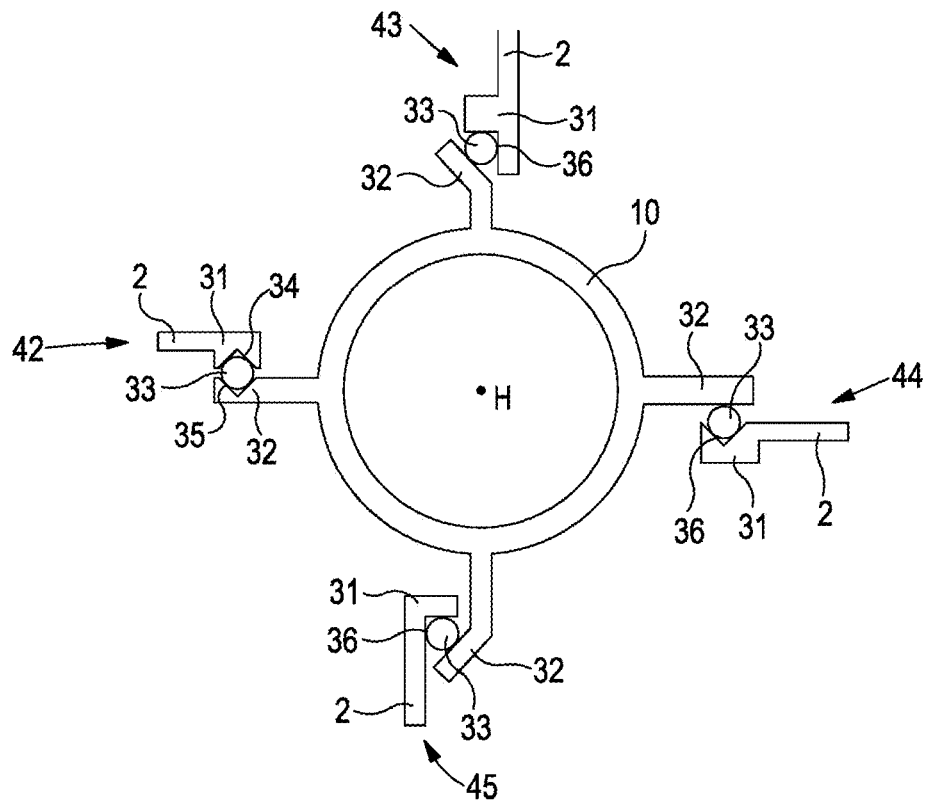

FIG. 10 illustrates a possible helical bearing arrangement that includes four helical bearings 42 to 45 only. The four helical bearings 42 to 45 are equally angularly spaced around the helical axis H.

The first helical bearing 42 is of the same type as the helical bearing 30 shown in FIG. 2 wherein the bearing surfaces 31 and 32 each comprise respective grooves 34 and 35.

The second, third and fourth helical bearings 43, 44 and 45 are each of the same type as the helical bearing 30 shown in FIG. 3 wherein the first bearing surface 31 comprises a groove 36 in which the rolling bearing element 33 is seated and the second bearing surface 32 is planar. FIG. 10 illustrates the case that the first bearing surface 31 of the second, third and fourth helical bearings 43, 44 and 45 is on the lens element 10, but it could alternatively be on the static part 2.

Each of the second, third and fourth helical bearings 43, 44 and 45 may comprise a single rolling bearing element 33 while the first helical bearing 42 comprises two rolling bearing elements. This is possible because the constraints imposed by four helical bearings 42 to 45 are sufficient to constrain the movement of the lens element 10 with respect to the static part 2 in degrees of freedom other than the helical movement.

Figure 9:
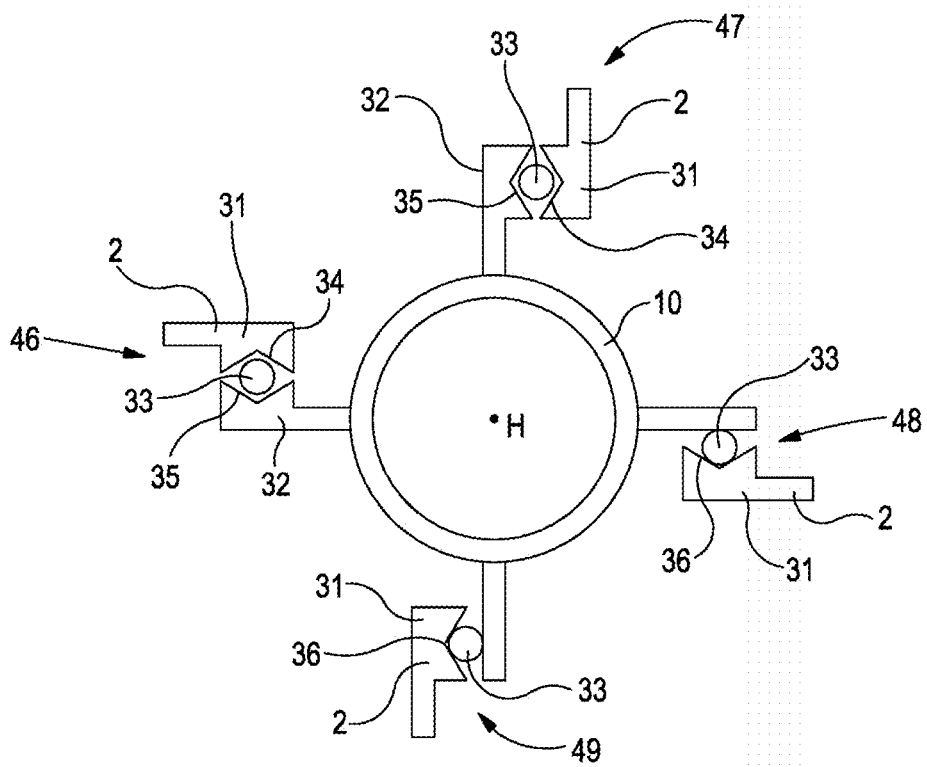

FIG. 9 illustrates another possible helical bearing arrangement that includes four helical bearings 46 to 49 only. The four helical bearings 46 to 49 are equally angularly spaced around the helical axis H, but they could alternatively be spaced unequally.

The first and second helical bearings 46 and 47 are of the same type as the helical bearing 30 shown in FIG. 2 wherein the bearing surfaces 31 and 32 each comprise respective grooves 34 and 35.

The third and fourth helical bearings 48 and 49 are of the same type as the helical bearing 30 shown in FIG. 3 wherein the first bearing surface 31 comprises a groove 36 in which the rolling bearing element 33 is seated and the second bearing surface 32 is planar. FIG. 9 illustrates the case that the first bearing surface 31 of the third and fourth helical bearings 48 and 49 on the lens element 10, but it could alternatively be on the static part 2.

Each of the four helical bearings 46 to 49 may comprise a single rolling bearing element 33. This is possible because the constraints imposed by four helical bearings 46 to 49 are sufficient to constrain the movement of the lens element 10 with respect to the static part 2 in degrees of freedom other than the helical movement. As a result of using only a single rolling bearing element 33 in each of the four helical bearings 46 to 49, the overall size of the four helical bearings 46 to 49, and in particular the height of the four helical bearings 46 to 49 projected along the helical axis H is reduced compared to the helical bearing arrangement of FIG. 4.

Figure 11:
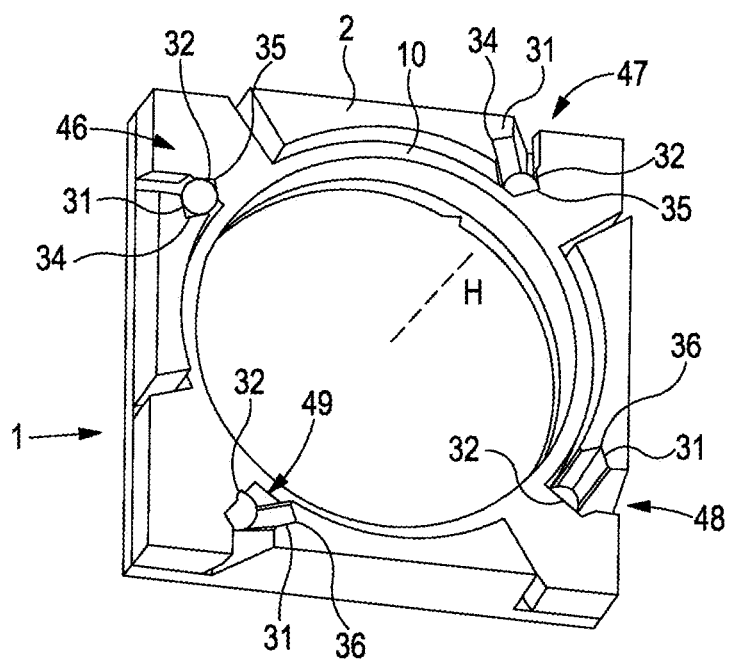
FIG. 11 is a perspective view of the helical bearing arrangement of the actuator assembly of FIG. 9.

FIG. 11 illustrates an example of the helical bearing arrangement 20 of the actuator assembly 1 shown in FIG. 9, wherein the static part 2 and the lens element 10 are formed by moulded components. In FIG. 11, the detailed form of the static part 2, the lens element 10 and the helical bearings 30 can be seen.

Figure 12:
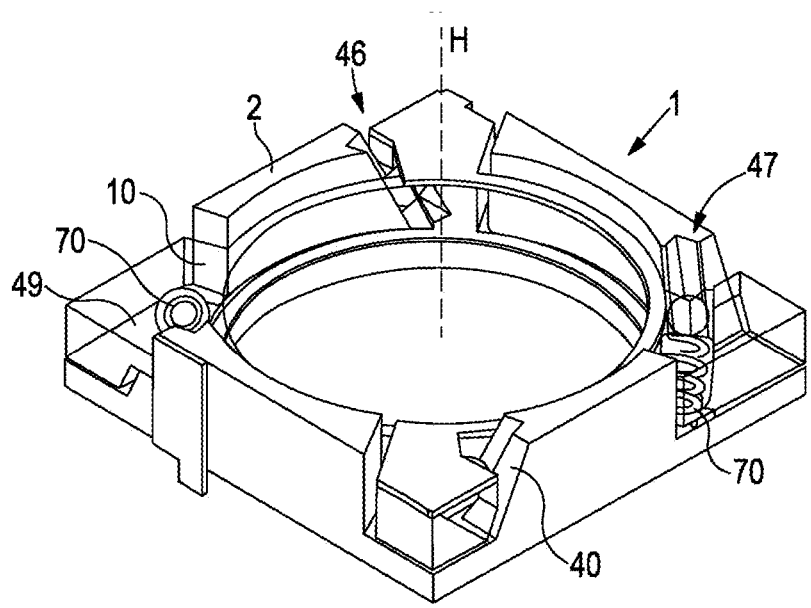
FIG. 12 is a perspective view of a first example of the actuator assembly of FIG. 9.
Figure 13:
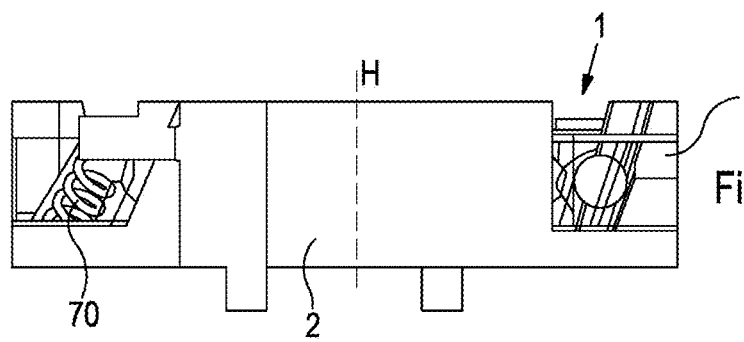
FIG. 13 is a side view of the actuator assembly shown in FIG. 12.
Figure 14:
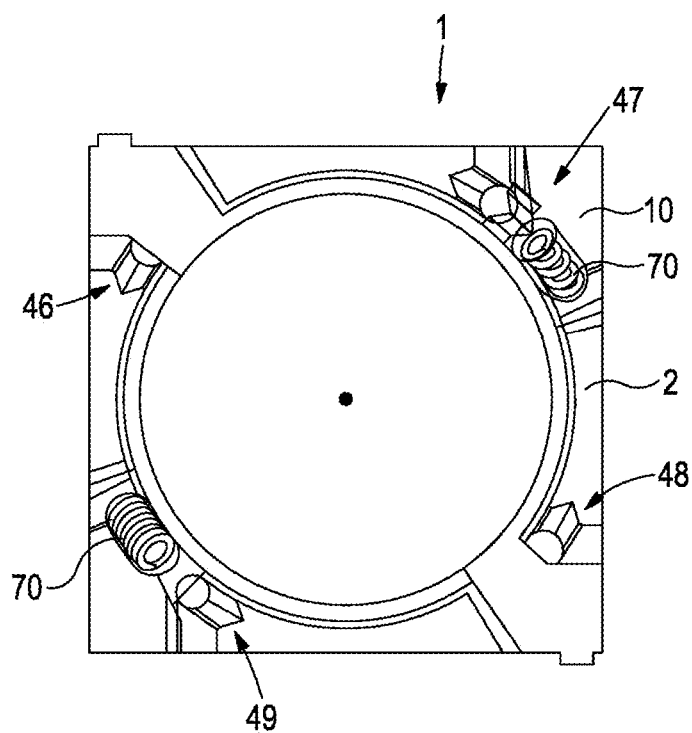
FIG. 14 is a plan view of the actuator assembly shown in FIG. 12.

FIGS. 12 to 14 illustrate a first example of the actuator assembly 1 shown in FIG. 9 including a helical bearing arrangement 20 as shown in FIG. 11. In addition, the actuator assembly 1 includes two resilient elements 70 connected in compression between the support structure 2 and the lens element 10 and extending at an acute angle to the helical axis H so that they provide a force with a component that loads the four helical bearings 46 to 49. The resilient element 70 is in this example a spring, but in principle could be formed by any other element for example being a flexure or a piece of resilient material.

Figure 15:
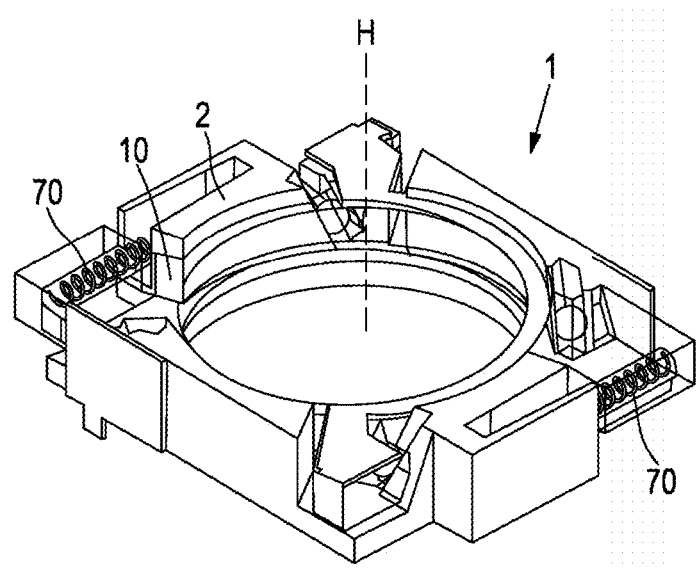
FIG. 15 is a perspective views of a second example of the actuator assembly of FIG. 9.
Figure 16:
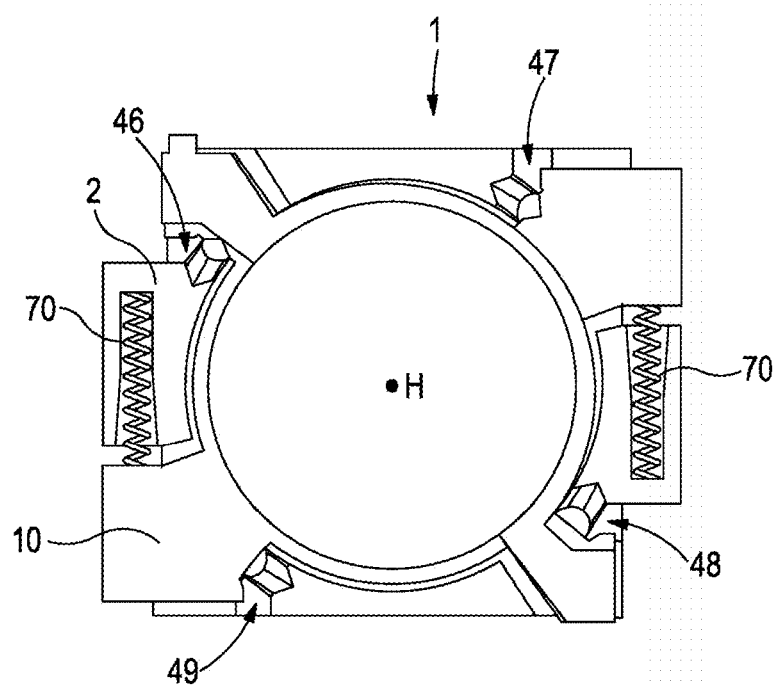
FIG. 16 is a plan view of the actuator assembly shown in FIG. 15.

FIGS. 15 and 16 illustrate a second example of the actuator assembly 1 shown in FIG. 9 including a helical bearing arrangement 20 as shown in FIG. 11. In addition, the actuator assembly 1 includes two resilient elements 70 connected in compression between the support structure 2 and the lens element 10 and extending orthogonally to the helical axis H with rotational symmetry around the helical axis H, so that they provide a force with a component that loads the helical bearings 46 to 49.

In each of the helical bearing arrangements described above, the bearing surfaces 32 which are on the lens element 10 are each arranged on the same side of (all above or all below) the bearing surfaces 31 on the support structure 2. As the bearing surfaces 31 and 32 extend helically, this means that in the view of FIG. 8 which is a cross-section perpendicular to the helical axis H, all the bearing surfaces 32 which are on the lens element 10 are on the right of the bearing surfaces 31 on the support structure 2 as viewed outwardly of the helical axis H, and in the view of FIGS. 9 and 10 all the bearing surfaces 32 which are on the lens element 10 are on the left of the bearing surfaces 31 on the support structure 2 as viewed outwardly of the helical axis H. As a result of this arrangement, the helical bearings all the bearing surfaces 31 on the support structure 2 face in the same direction as each other, which assists in manufacture of the bearing surfaces 31 by the same tool. Similarly, manufacturing advantages apply to the bearing surfaces 32 on the lens element 2 which also face in the same direction as each other.

As a result of this arrangement, all the helical bearings 30 need to be loaded in the same helical sense. Thus loading of the helical bearings 30 may be provided by applying a loading force along the helical axis H, a loading force around the helical axis H, or a combination thereof. In the arrangements described in more detail below, this loading force may be applied by the resilient biasing element 70.

Figure 17:
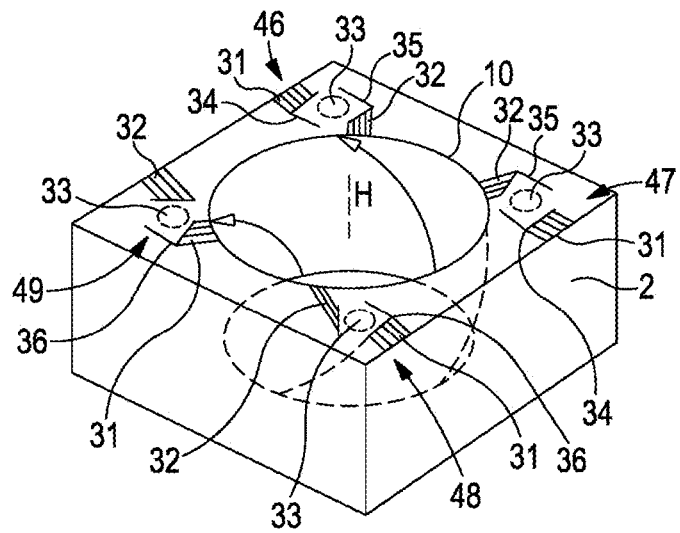
FIG. 17 is a perspective view of the actuator assembly with another possible helical bearing arrangement.

FIG. 17 illustrates another possible helical bearing arrangement that is a modification of the helical bearing arrangement of FIG. 7. Thus, the helical bearing arrangement includes four helical bearings 46 to 49 only, and the four helical bearings 46 to 49 are equally angularly spaced around the helical axis H, but they could alternatively be spaced unequally.

As in the helical bearing arrangement of FIG. 11, (a) the first and second helical bearings 46 and 47 are of the same type as the helical bearing 30 shown in FIG. 2 wherein the bearing surfaces 31 and 32 each comprise respective grooves 34 and 35, and (b) the third and fourth helical bearings 48 and 49 are of the same type as the helical bearing 30 shown in FIG. 3 wherein the first bearing surface 31 comprises a groove 36 in which the rolling bearing element 33 is seated and the second bearing surface 32 is planar. FIG. 17 illustrates the case that the first bearing surface 31 of the third and fourth helical bearings 48 and 49 is on the lens element 10, but it could alternatively be on the support structure 2.

As in the helical bearing arrangement of FIG. 17, each of the four helical bearings 46 to 49 may comprise a single rolling bearing element 33. This is possible because the constraints imposed by four helical bearings 46 to 49 are sufficient to constrain the movement of the lens element 10 with respect to the support structure 2 in degrees of freedom other than the helical movement. As a result of using only a single rolling bearing element 33 in each of the four helical bearings 46 to 49, the overall size of the four helical bearings 46 to 49, and in particular the height of the four helical bearings 46 to 49 projected along the optical axis is reduced when each of the helical bearings has a single rolling element only.

However, the helical bearing arrangement of FIG. 17 is modified compared to that of FIG. 11 to change the arrangement of the bearing surfaces 31 and 32 in the individual bearings 46 to 49, as follows. In the first helical bearing 46, the bearing surfaces 32 on the lens element 10 are above the bearing surfaces 31 on the support structure 2 as viewed along the helical axis H, whereas in the second helical bearing 47, the bearing surfaces 32 on the lens element 10 are below the bearing surfaces 31 on the support structure 2 as viewed along the helical axis H. Similarly, in the third helical bearing 48, the bearing surfaces 32 on the lens element 10 are above the bearing surfaces 31 on the support structure 2 as viewed along the helical axis H, whereas in the fourth helical bearing 49, the bearing surfaces 31 on the lens element 10 are below the bearing surfaces 32 on the support structure 2 as viewed along the helical axis H.

This may be understood on the following basis with reference to a constraint of the bearings in the vertical plane, parallel to the helical axis. The first and third helical bearings 46 and 48 constrain the lens element 10 from moving down, and the second and fourth helical bearings 47 and 49 constrain the lens element 10 from moving up, or rotating around an axis between first and third helical bearings 46 and 48.

As a result of this arrangement, the helical bearings 46 to 49 do not all need to be loaded in the same helical sense around the helical axis H. This facilitates the loading of the helical bearings 46 to 49. For example, this arrangement allows for loading by a resilient loading arrangement as will now be described.

Optionally, an etching may be used to create resilient loading of any of the bearing surfaces on the lens element 10, in which case this same etching can be used to create a common connection between support structure 2 and the lens element 10.

Any of the types of helical bearing arrangement 20 may include a resilient loading arrangement that loads a bearing surface of at least one of the rolling bearings with respect to the support structure or the moveable element on which the bearing surface is provided, against the rolling bearing element. FIGS. 18 to 22 show some examples of resilient loading arrangements of this type.

Each of the examples of FIGS. 18 to 22 is applied to a rolling bearing 100 that comprises a first bearing surface 101, a second bearing surface 102 and a rolling bearing element 103 (for example a ball or a roller) disposed between the first and second bearing surfaces 101 and 102. The rolling bearing 100 may be applied as any one or more of the rolling bearings of the helical bearings in any SMA actuation apparatus 1 described herein. When so applied, the first bearing surface 101 is provided on one of the support structure 2 or the lens element 10, and the second bearing surface 102 is provided on the other of the support structure 2 or the lens element 10, either way around. In each case, the first bearing surface 101 is movable with respect to one of the support structure 2 or the lens element 10 on which it is provided. In contrast, the second bearing surface 102 is fixed with respect to the other of the support structure 2 or the lens element 10 on which it is provided.

Figure 18:
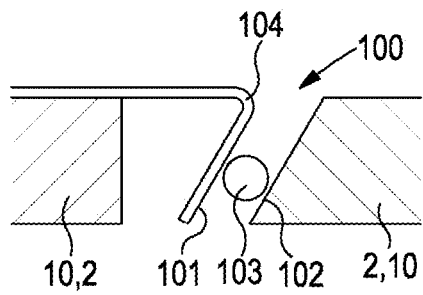
FIGS. 18 to 22 are side views of possible loading arrangements.

In the example of FIG. 18, the first bearing surface 101 is formed on a flexure element 104 that is connected to the lens element 10 or the support structure 2. The flexure element 104 is made of a resilient material, typically metal such as steel, and is connected to the adjacent part of the lens element 10 or the support structure 2. Thus, the flexure element 104 is a resilient element which both allows the movement of the first bearing surface 101 with respect to the adjacent support structure 2 or lens element 10 and acts as a resilient loading arrangement that resiliently loads the first bearing surface 101 away from the adjacent part of the lens element 10 or the support structure 2, against the rolling bearing element 103.

Figure 19:
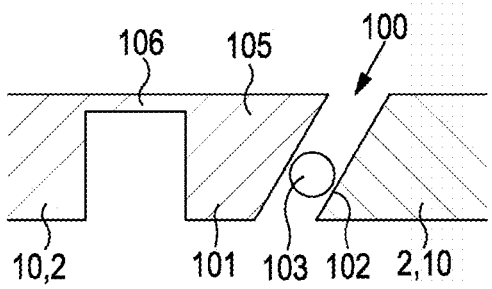

In the example of FIG. 19, the first bearing surface 101 is formed on a body 105. The body 105 is connected to the lens element 10 or the support structure 2 by a bridge portion 106 formed integrally with the body 105 and the adjacent part of the lens element 10 or the support structure 2 which allows the movement of the first bearing surface 101 with respect to the adjacent support structure 2 or lens element 10. The bridge portion 106 is configured as a resilient element arranged between the body 105 and the adjacent part of the lens element 10 or the support structure 2. Thus, the bridge portion 106 acts as a resilient loading arrangement that resiliently loads the body 106 and hence the first bearing surface 101 away from the adjacent part of the lens element 10 or the support structure 2, against the rolling bearing element 103.

Figure 20:
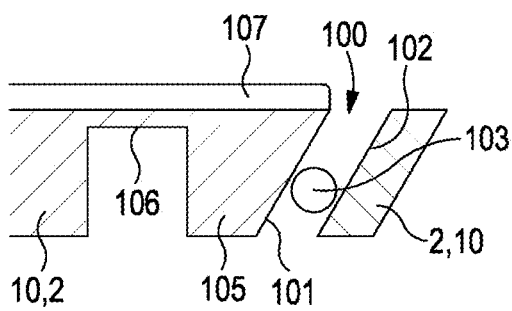

The example of FIG. 20 is the same as the example of FIG. 19, except that a flexure element 107 is connected to the bridge portion 106. In this case, the flexure element 107 and the bridge portion 106 together allow the movement of the first bearing surface 101 with respect to the adjacent support structure 2 or lens element 10, whereas the flexure element 107 is a resilient element which acts as a resilient loading arrangement that resiliently loads the body 106 and hence the first bearing surface 101 away from the adjacent part of the lens element 10 or the support structure 2, against the rolling bearing element 103. In contrast to the example of FIG. 19, the flexure element 107 may be designed to provide the dominant resilient effect. The bridge portion 106 may have resilience and thus contribute to the loading in combination with the flexure element 107, or may have substantially no resilience compared to the flexure element. As such, the bridge portion 106 may be relatively thin compared to the example of FIG. 10. Advantageously, this arrangement reduces the occurrence of stress relaxation.

Figure 21:
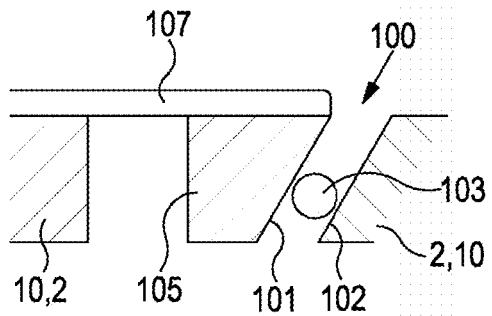

The example of FIG. 21 is the same as the example of FIG. 20, except that the bridge portion 106 is omitted, so that the body portion 105 is a separate element from the adjacent part of the lens element 10 or the support structure 2, and is connected thereto by the flexure element 107. As a result, the flexure element 107 alone is a resilient element which acts as a resilient loading arrangement that resiliently loads the body 105 and hence the first bearing surface 101 away from the adjacent part of the lens element 10 or the support structure 2, against the rolling bearing element 103.

Figure 22:
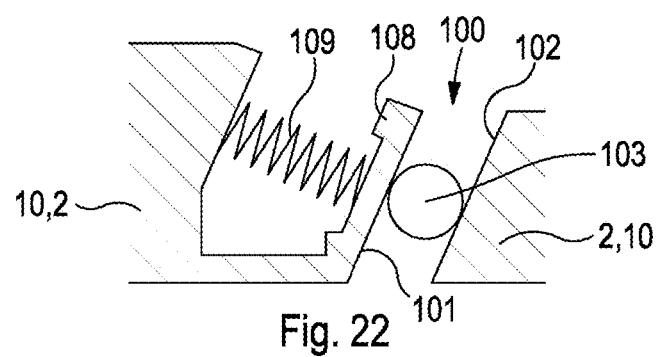

In the example of FIG. 22, the first bearing surface 101 is formed on a flexible arm 108 that is formed integrally with the adjacent part of the lens element 10 or the support structure 2. Thus, the flexible arm 108 allows the movement of the first bearing surface 101 with respect to the adjacent support structure 2 or lens element 10. In addition, a spring 109 (or other resilient element) is arranged between the arm 108 and the adjacent support structure 2 or lens element 10. The spring 109 is in compression. Thus, the spring 109 is a resilient element which acts as a resilient loading arrangement that resiliently loads the first bearing surface 101 away from the adjacent part of the lens element 10 or the support structure 2, against the rolling bearing element 103.

Another alternative for the resilient loading arrangement is that one of the bearing surfaces on either the support structure 2 or lens element 10 is replaced by an etching, a thin walled section of the support structure 2 or lens element 10. Considering a thin wall or twist in either support structure 2 or lens element 10, these tolerance accommodations could be fixed for each assembly by using glue. In the case that SMA actuation apparatus 1 is a camera, the thin wall section or twist in the lens element 10 could be fixed into position when the lens is glued into position, or the thin wall section or twist in the chassis could be fixed into position when a screening can is glued into position. Such thin walls or twists could be made to dynamically accommodate variations in bearing surface, in the same way as the examples of FIGS. 18 to 22.

Figure 22A:
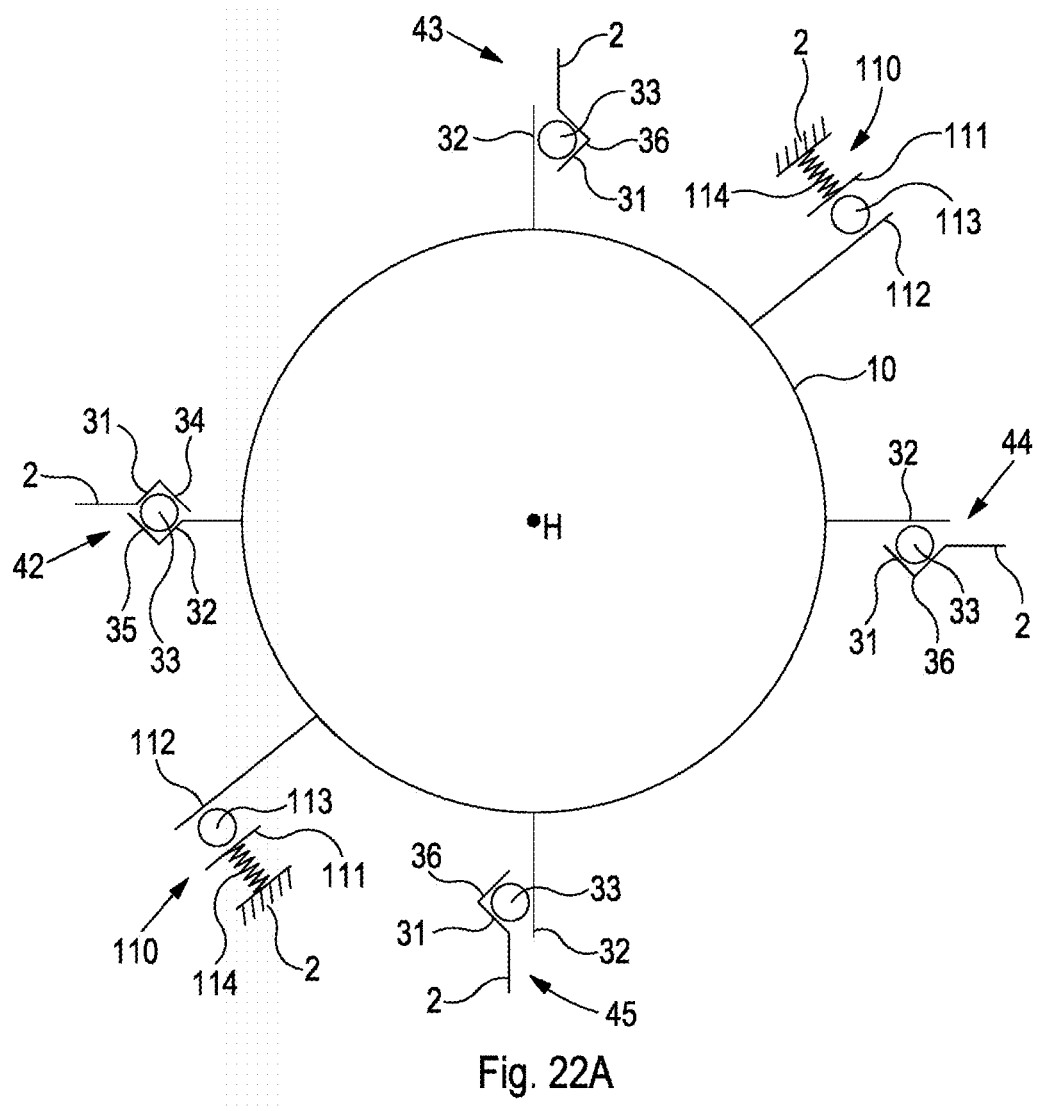
FIG. 22A is a schematic cross-sectional view of the actuator assembly with yet another possible helical bearing arrangement

FIG. 22A shows an example of the actuator assembly 1 with a helical bearing arrangement which is similar to that of FIG. 10 but with some modifications as will now be described. The helical bearing arrangement includes four helical bearings 42 to 45 that are arranged in the same as in FIG. 10, as described above. The helical bearings 42 to 45 each include a single rolling bearing element 33, so that they provide a total of five constraints. The first helical bearing 42 is of the same type as the helical bearing 30 shown in FIG. 2, wherein the bearing surfaces 31 and 32 each comprise respective grooves 34 and 35. The second, third and fourth helical bearings 43, 44 and 45 are each of the same type as the helical bearing 30 shown in FIG. 3, wherein the first bearing surface 31 comprises a groove 36 in which the rolling bearing element 33 is seated and the second bearing surface 32 is planar. As in FIG. 10, the first bearing surface 31 of the second, third and fourth helical bearings 43, 44 and 45 is illustrated as being on the lens element 10, but it could alternatively be on the support structure 2.

The bearing surfaces 32 which are on the lens element 10 are each arranged on the same side of (all above or all below) the bearing surfaces 31 on the support structure 2. As the bearing surfaces 31 and 32 extend helically, this means that in the view of FIG. 22A which is a cross-section perpendicular to the helical axis H, all the bearing surfaces 32 which are on the lens element 10 are on the left of the bearing surfaces 31 on the support structure 2 as viewed outwardly of the helical axis H. As a result of this arrangement, all the helical bearings 42 to 46 need to be loaded in the same helical sense, corresponding to a clockwise rotation of the lens element 10 in FIG. 22A.

To provide such loading, the helical bearing arrangement is modified compared to FIG. 10 to include two additional rolling bearings 110 that are helical bearings arranged as follows. The rolling bearings 110 comprise a first bearing surface 111, a second bearing surface 112 and a rolling bearing element 113 (for example a ball or a roller) disposed between the first and second bearing surfaces 111 and 112. The first bearing surface 111 is movable with respect to the support structure 2 and a resilient element 114 is arranged between the first bearing surface 111 and the support structure 2. The resilient element 114 loads the first bearing surface 111 away from the support structure 2, thereby acting as a resilient loading arrangement that resiliently loads the first bearing surface 111 against the rolling bearing element 113. As an alternative, the rolling bearing element 110 could be reversed so that the second bearing surface 112 is movable with respect to the lens element 10 and the resilient element 114 loads the second bearing surface 112 against the rolling bearing element 113. The additional rolling bearings 110 may have any suitable construction, including the construction of the rolling bearing 110 in any of the examples of FIGS. 18 to 22.

The additional rolling bearings 110 are arranged the opposite way around relative to the helical bearings 42 to 46 so that they load the helical bearings 42 to 46 in the same helical sense, corresponding to a clockwise rotation of the lens element 10 in FIG. 22A. As a result, the helical bearing arrangement shown in FIG. 22A is highly balanced and the tolerances are reduced, which assists manufacture. Similarly to the helical bearing arrangement of FIG. 10, manufacture of the helical bearings 42 to 46 is assisted by all the bearing surfaces 31 on the support structure 2 facing in the same direction as each other, and all the bearing surfaces 32 on the lens element 10 facing in the same direction as each other.

Two additional rolling bearings 110 are shown here, arranged on opposite sides of the lens element 10. More generally, any number of one or more additional rolling bearings 110 may be provided, but plural additional rolling bearings 110 spaced around the lens element 10 are advantageous to assist balancing of forces.

In the above examples, the helical bearings 30 are rolling bearings, but in each case the helical bearings 30 may be replaced by a sliding bearing, two examples of which are shown in FIGS. 23 to 26.

Figure 23:
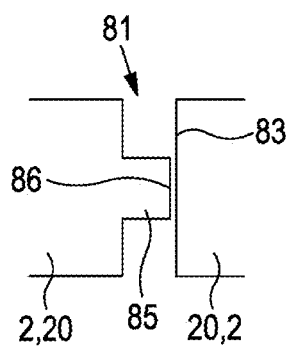
FIG. 23 is a cross-sectional view of a first alternative bearing, the cross-section being taken perpendicular to the direction of movement of the bearing.
Figure 24:
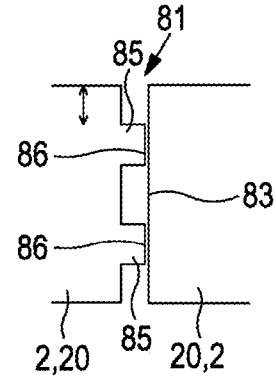
FIG. 24 is a side view of the first alternative bearing of FIG. 23.
Figure 25:
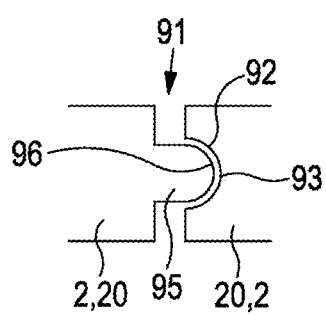
FIG. 25 is a cross-sectional view of a second alternative bearing, the cross-section being taken perpendicular to the direction of movement of the bearing.

In the first example shown in FIGS. 23 and 25, the plain bearing 81 comprises an elongate bearing surface 83 on one of the support structure 2 and the lens element 10. The plain bearing 81 also comprises protrusions 85 formed on the other of the support structure 2 and lens element 10, the ends of the protrusions 85 forming bearing surfaces 86 which bear on the elongate bearing surface 83. Although two protrusions 85 are shown in this example, in general any number of one or more protrusions 85 may be provided. The elongate bearing surface 83 and the bearing surfaces 86 are conformal, both being planar in this example, so as to permit relative movement of the lens element 10 with respect to the support structure 2. The elongate bearing surface 83 and the bearing surfaces 86 desirably have a coefficient of friction of 0.2 or less.

Figure 26:
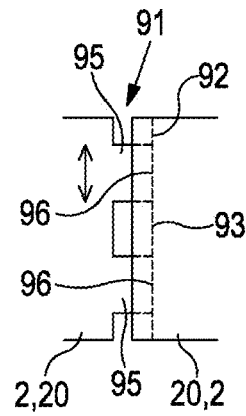
FIG. 26 is a side view of the alternative bearing of FIG. 25.

In the second example shown in FIGS. 25 and 26, the plain bearing 91 comprises a channel 92 on one of the support structure 2 and the lens element 10, the inner surface of the channel 92 forming a bearing surface 93. The plain bearing 91 comprises protrusions 95 formed on the other of the support structure 2 and lens element 10, the ends of the protrusions 95 forming bearing surfaces 96 which bear on the bearing surface 93. Although two protrusions 95 are shown in this example, in general any number of one or more protrusions 95 may be provided. The elongate bearing surface 93 and the bearing surfaces 96 are conformal, both being planar in this example, so as to permit relative movement of the lens element 10 with respect to the support structure 2. The elongate bearing surface 93 and the bearing surfaces 96 desirably have a coefficient of friction of 0.2 or less.

In each of the plain bearings 81 and 91, the materials of the bearing surfaces 83, 86, 93, 96 are chosen to provide smooth movement and a long life. The bearing surfaces 83, 86, 93, 96 may be unitary with the underlying component or may be formed by a surface coating. Suitable materials include, for example PTFE or other polymeric bearing materials, or metal.

In each of the plain bearings 81 and 91, a lubricant may be provided on the bearing surfaces 83, 86, 93, 96. Such a lubricant may be a powder or a fluid, for example. Suitable lubricants include: graphite; silicon paste or a low viscosity oil.

Figure 27:
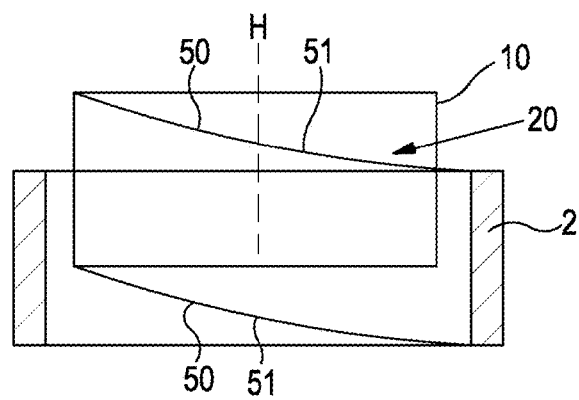
FIG. 27 is a side view of the actuator assembly with a helical bearing arrangement comprising plural flexures.
Figure 28:
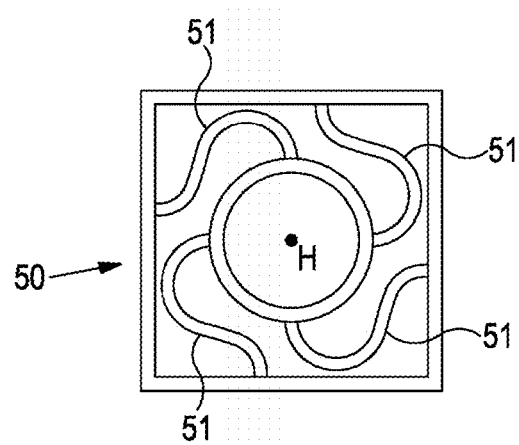
FIGS. 28 and 29 are plan views of the helical bearing arrangement of FIG. 27 with different forms of flexures.
Figure 29:
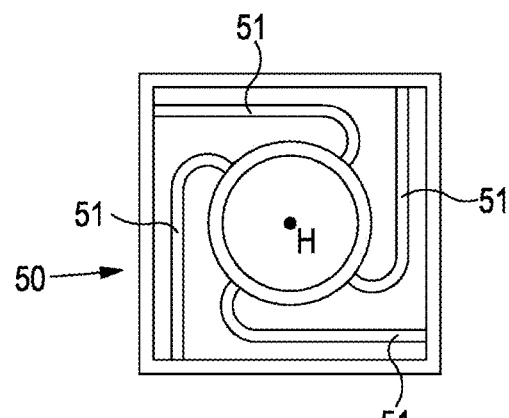
Figure 29A:
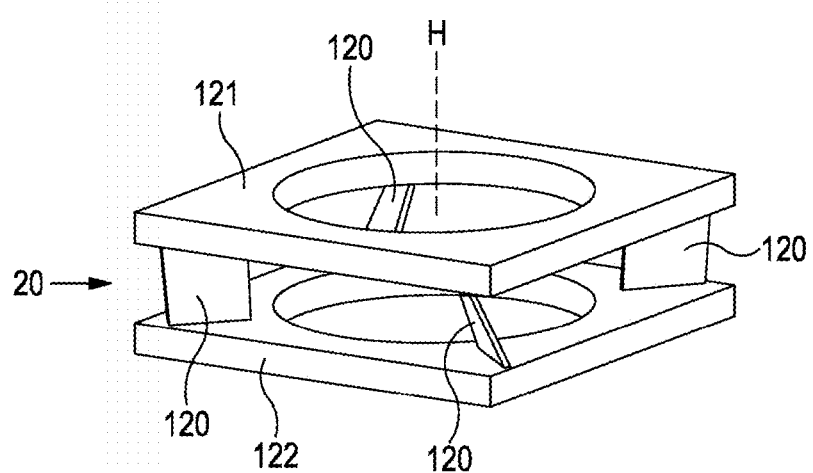
FIG. 29A is a perspective view of an alternative helical bearing arrangement comprising plural flexures.

While the helical bearing arrangement 20 comprises helical bearings 30 that are rolling bearings in the above example, another possibility is that the helical bearing arrangement 20 comprises at least one flexure extending between the static part 2 and the lens element 10 as shown for example in FIG. 27 wherein the helical bearing arrangement 20 comprises two flexure elements 50 that each comprise four flexures 51 having a configuration as shown either in FIG. 28 or in FIG. 29. As shown in FIG. 27, the flexures 51 are each pre-deflected along the helical axis H, and as shown in FIGS. 28 and 29, the flexures 51 each extend in an arc around the helical axis H. As a result of this configuration, the flexures 51 guide the helical movement of the lens element 10 with respect to the static part 2 around the helical axis H. The specific number and arrangement of flexures 51 in FIGS. 27 to 29 is not essential and other configurations of flexures that are pre-deflected along the helical axis H and extend in an arc around the helical axis H may be used to provide the same function.

FIG. 22 is a perspective view of an alternative helical bearing arrangement 20 comprising plural flexures 120, four flexures 120 being shown in FIG. 22 although in general any number of flexures 120 could be provided. In this example, the helical bearing arrangement also comprises a movable plate 121 mounted on lens element 10 and a support plate 122 mounted on the support structure 2. The movable plate 121 and the support plate 122 are spaced along the helical axis H and the flexures 120 extend along the helical axis H and are inclined with respect to a plane normal to the helical axis H helical axis with rotational symmetry around the helical axis H. With this arrangement, the flexures 120 guide the helical movement of the lens element 10 with respect to the support structure 2 around the helical axis H.

The flexures 120 are integrally formed with the movable plate 120 and the support plate 122. This form of connection is advantageous because it allows the helical bearing arrangement to be made as a single part, for example in a moulding, providing exact constrains. This solution therefore combines precision with a low manufacturing cost. That said, in principle the flexures 120 could be separate elements connected to the lens element 10 and the support structure 2 in any suitable way.

Figure 30:
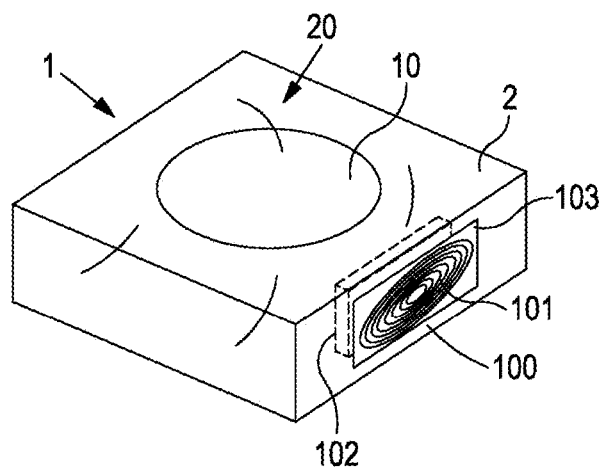
FIGS. 30 to 32 are perspective views of actuator assemblies with three different arrangements of actuators.
Figure 31:
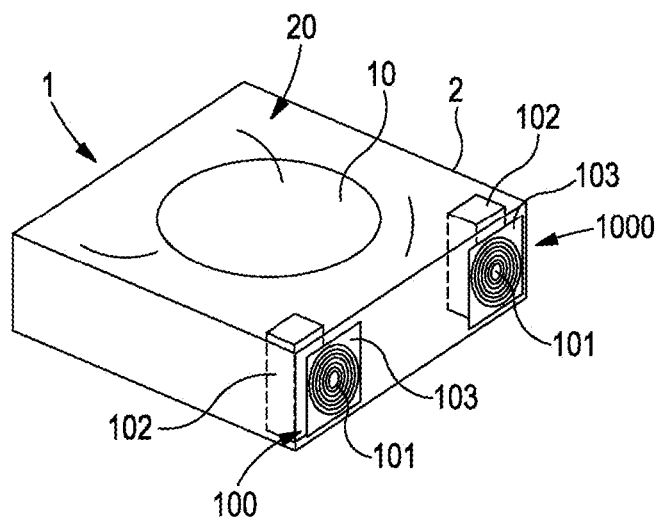
Figure 32:
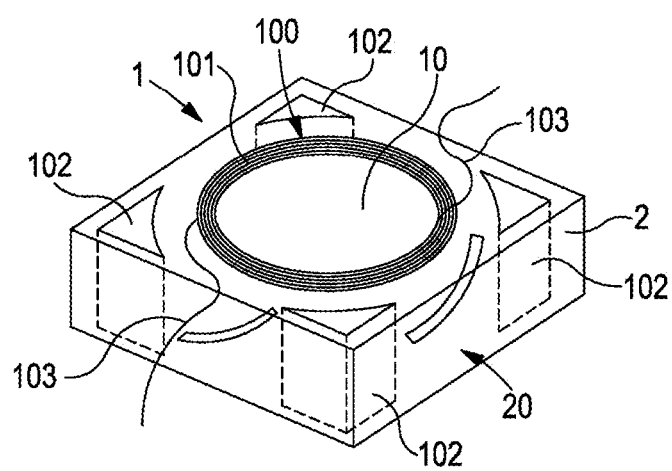

In addition, the actuator assembly 1 includes one or more actuators arranged to drive movement of the lens element 10 with respect to the static part 2 around the helical axis H as shown in the examples of FIGS. 30 to 32. In each of the examples of FIGS. 30 to 32, the static part 2, the lens element 10 and the helical bearing arrangement 20 are shown schematically, for clarity, but may take any of the forms shown in FIGS. 1 to 26 and described above.

In addition, the examples of FIGS. 30 to 32 include various numbers of voice coil motors 100. Each voice coil motor 100 is formed by a coil 101 and a magnetic element 102, for example a magnet, an arrangement of magnets, or a magnetisable portion. Each voice coil motor 100 is configured in a conventional manner so that the coil 101 drives movement of the magnetic element 2 in a direction across the interface between the coil 100 and the magnetic element 102. A control circuit (not shown) supplies the coil 101 with a drive signal selected to provide the desired movement.

Although voice coil motors 100 are shown in these examples, as an alternative the voice coil motors 100 could be replaced by any other form of actuator that is not a shape memory alloy actuator, for example a piezoelectric actuator, a radial motors or others.

In the examples of FIGS. 30 and 31, the coil 101 is mounted on the static part 2 and the magnetic element 102 is mounted on the lens element 10. That is advantageous because it facilitates supply of power to the coil 101, but as an alternative it may be that the coil 101 is mounted on the lens element 10 and the magnetic element 102 is mounted on the static part.

In the examples of FIGS. 30 and 31, the voice coil motors 100 additionally include a magnetically attractive plate 103 (made of any suitable material, for example steel) that is positioned next to the coil 101 and mounted on the same element as the coil 101, i.e. the lens element 10 in this example. The magnetically attractive plate 103 attracts the magnetic element 102 towards the coil 101 when no drive signal is supplied to the coil 101.

In the first example shown in FIG. 30, the actuator assembly 1 has a single voice coil motor 100 arranged on one side of the actuator assembly 1, whereas in the second arranged in adjacent corners of the actuator assembly 1. In both examples, the helical bearings 30 of the helical bearing arrangement 20 and the voice coil motor(s) 100 may be arranged so that the internal force of the voice coil motor(s) 100 between the coil 101 and the magnetic element 102, that is orthogonal to the helical axis H, also loads the helical bearings 30, which may allow the resilient element 70 to be omitted. However, the second example having two voice coil motors 100 may provide better balancing of the loading.

In the first and second examples shown in FIGS. 30 and 31, the voice coil motor(s) 100 may be oriented as follows to apply force in different directions.

In one alternative, the voice coil motor(s) 100 may be oriented to apply a force along the helical axis H, that is in the desired direction of translational movement of the lens element 10. This allows the voice coil motor(s) 100 to have a configuration that is known for driving an actuator assembly in which a helical bearing arrangement provides movement along the helical axis.

In that case, the voice coil motor(s) 100 drive translational movement of the lens element 10 along the helical axis H which the helical bearing arrangement 20 converts into helical movement around the helical axis H. This causes the voice coil motor(s) 100 to load the helical bearings 30, which may allow the resilient element 70 to be omitted.

In another alternative, the voice coil motor(s) 100 may be arranged to apply a force orthogonal to the helical axis H. In that case, the voice coil motor(s) 100 drive rotational movement of the lens element 10 around the helical axis H which the helical bearing arrangement 20 converts into helical movement around the helical axis H. This causes the voice coil motor(s) 100 to load the helical bearings 30, which may allow the resilient element 70 to be omitted.

In another alternative, the voice coil motor(s) 100 may be arranged to apply a force helically around the helical axis. In that case, the voice coil motor(s) 100 drive helical movement around the helical axis H directly. In this case the resilient element 70 may be provided where loading of the helical bearings 30 is required.

In the third example shown in FIG. 32, the actuator assembly 1 has a single voice coil motor 100 comprising a coil 101 mounted on the lens element 10 and extending around the helical axis H outside the optical aperture, and plural magnetic elements 102 mounted on the static part 2 and spaced around the helical axis H, but not necessarily symmetrically. The coil 101 is connected to a control circuit (not shown) mounted on the static part 2 for supply of drive signals by flexible connectors 103 which may form part of the helical bearing arrangement 20, and/or may load the bearings 30, or may have no mechanical effect on the movement of the lens element 10. In FIG. 32, four magnetic elements 102 are provided and this is convenient for arrangement within a rectangular footprint, but in general any number of magnetic elements 102 may be used. Such an arrangement assists in balancing the forces applied to the lens element 10, and thereby reduces tilting.

In this case, the voice coil motor 100 applies a force along the helical axis H, that is in the desired direction of translational movement of the lens element 10. In that case, the voice coil motor 100 drive translational movement of the lens element 10 along the helical axis H which the helical bearing arrangement 20 converts into helical movement around the helical axis H. This causes the voice coil motor 100 to load the helical bearings 30, which may allow the resilient element 70 to be omitted.

Regardless of the orientation of the voice coil motor(s) and the applied force, in each of the examples of FIGS. 30 to 32, the driven movement of the lens element 10 with respect to the static part 2 around the helical axis H includes, as well as the component of rotational movement, a component of translational movement along the helical axis H, which is the desired translational movement. This changes the focus of the image on the image sensor 3 as described above.

By arranging the helical bearing arrangement 20 to guide helical movement of the lens element 10 with respect to the static part 2, the ratio of the travel of the voice coil motor(s) 100 to the stroke of the lens element 10 is geared up. That is, the magnetic element 102 travels a greater distance by travelling helically around the desired direction of translational movement, than it would do if moved directly along the desired direction of translational movement. This reduces the problems of poor posture and low force in the manner discussed above.

This benefit may be increased by making the angle of the helical movement provided by the helical bearing arrangement 20 shallower, up to the point at which the differential motion between the magnetic portion 102 and the coil 101 means that they are no longer able to generate the desired force

The invention claimed is:

1. An actuator assembly comprising:
a static part;
a movable part;
a helical bearing arrangement supporting the movable part on the static part and arranged to guide movement of the movable part, with respect to the static part, to both rotate around, and translate along, a helical axis; and
one or more actuators arranged to drive movement of the movable part with respect to the static part around the helical axis, wherein the one or more actuators comprise at least one of a voice coil motor comprising a magnetic element mounted on the moveable part or the static part.

2. An actuator assembly according to claim 1, wherein the actuator assembly comprises only a single actuator.

3. An actuator assembly according to claim 2, wherein the single actuator comprises a coil mounted on the movable part, wherein the magnetic element comprises a plurality of magnetic elements mounted on the static part and spaced around the helical axis.

4. The actuator assembly according to claim 3, wherein the coil extends around the helical axis.

5. An actuator assembly according to claim 1, wherein:
the voice coil motor comprises a coil mounted on the static part and a magnetic element mounted on the movable part; and
optionally the one or more actuators are two actuators.

6. An actuator assembly according to claim 1, wherein:
the one or more actuators are arranged to apply a force at least one of:
along the helical axis;
orthogonal to the helical axis; or
helically around the helical axis; and
the helical bearing arrangement converts the force applied from the one or more actuator into said helical movement.

7. An actuator assembly according to claim 1, wherein the helical bearing arrangement comprises one or more helical bearings that are each a rolling bearing comprising bearing surfaces on the static part and the movable part and at least one rolling bearing element disposed between the bearing surfaces.

8. An actuator assembly according to claim 7, further comprising a loading arrangement that loads at least one of the bearing surfaces against the rolling bearing element.

9. An actuator assembly according to claim 8, wherein the loading arrangement is a magnetic loading arrangement.

10. An actuator assembly according to claim 7, wherein the one or more actuators are arranged to load the one or more helical bearings.

11. An actuator assembly according to claim 7, wherein the one or more helical bearings comprise a plurality of helical bearings.

12. An actuator assembly according to claim 11, wherein the one or more helical bearings are two helical bearings.

13. An actuator assembly according to claim 12, wherein:
each helical bearing is a rolling bearing comprising bearing surfaces on the static part and the movable part and at least one rolling bearing element disposed between the bearing surfaces;
the bearing surfaces of a first of the two helical bearings comprises grooves on each of the static part and the movable part;
the bearing surfaces of a second of the two helical bearings comprises a groove on one of the static part and the movable part and a planar surface on the other of the static part and the movable part; and
the first of the two helical bearings optionally comprises a plurality of rolling bearing elements.

14. An actuator assembly according to claim 11, wherein the one or more helical bearings are three helical bearings.

15. An actuator assembly according to claim 14, wherein each helical bearing is a rolling bearing comprising bearing surfaces on the static part and the movable part and at least one rolling bearing element disposed between the bearing surfaces, the bearing surfaces of a first and a second of the three helical bearings each comprising grooves on each of the static part and the movable part, and the bearing surfaces of a third of the three helical bearings comprising a groove on the static part and a planar surface on the movable part or comprising a groove on the movable part and a planar surface on the static part, the first, second, and third of the helical bearings optionally each comprising a single rolling bearing element only.

16. An actuator assembly according to claim 1, wherein:
the helical bearing arrangement comprises at least one flexure extending between the static part and the movable part;
the at least one flexure is arranged to guide the helical movement of the movable part with respect to the static part around the helical axis; and
optionally the flexures extend in an arc around the helical axis and are pre-deflected along the helical axis.

17. An actuator assembly according to claim 16, wherein the at least one flexure comprises a plurality of flexures that extend along the helical axis and are inclined with respect to a plane perpendicular to the helical axis with rotational symmetry around the helical axis.

18. An actuator assembly according to claim 16, wherein the helical bearing arrangement further comprises a support plate mounted on the static part and movable plate mounted on movable part the at least one flexure being integrally formed with the support plate and the movable plate.

19. An actuator assembly according to claim 1, wherein:
the movable part is a lens element comprising at least one lens; and
the static part has an image sensor mounted thereon, the lens element being arranged to focus an image on the image sensor.

* * * * *